United States Patent

[11] 3,633,084

[72] Inventor Rodney G. Rakes
 Bristol, Tenn.
[21] Appl. No. 49,475
[22] Filed June 24, 1970
[45] Patented Jan. 4, 1972
[73] Assignee Sperry Rand Corporation

[54] BRUSHLESS DC MOTOR HAVING AUTOMATIC BRAKING
 7 Claims, 2 Drawing Figs.
[52] U.S. Cl. .................................................. 318/254,
 318/377, 318/364
[51] Int. Cl. .................................................... H02k 29/00
[50] Field of Search .......................................... 318/254,
 439, 138, 377, 696, 685, 377, 364

[56] References Cited
 UNITED STATES PATENTS
| | | | |
|---|---|---|---|
| 3,374,410 | 3/1968 | Cronquist et al. | 318/685 |
| 3,127,548 | 3/1964 | Van Emden | 318/138 |
| 3,396,322 | 8/1968 | Shimabukuro | 318/138 |
| 3,443,181 | 5/1969 | Kozol et al. | 318/138 |
| 3,117,268 | 1/1964 | Madsen | 318/138 |

*Primary Examiner*—G. R. Simmons
*Attorney*—S. C. Yeaton

ABSTRACT: A single-sensor, two-winding brushless DC motor includes a main power supply from which the stator windings are energized and an auxiliary power supply through which a commutating circuit is energized. A position-sensing circuit provides a command signal only while the rotor is within a given 180° sector. The commutating means completes a circuit through a first stator winding in response to a command signal; a circuit through a second stator winding in the absence of a command signal. Dynamic braking is achieved by turning off the main power supply while keeping the auxiliary power supply on. Under these conditions, the commutating means completes a circuit through the second stator winding so that the kinetic energy of the rotor may be dissipated and the motor stopped smoothly and rapidly.

INVENTOR.
RODNEY G. RAKES

3,633,084

BRUSHLESS DC MOTOR HAVING AUTOMATIC BRAKING

BACKGROUND OF THE INVENTION

1. Field of the Invention

The invention relates to brushless DC motors and more specifically to braking means for brushless DC motors.

2. Description of the Prior Art

A wide variety of brushless DC motors (BDCM's) is known in the art. In one type of BDCM, a single sensor is used to detect the semicircular sector which the rotor occupies at any given instant. Stator windings are energized in accordance with this information.

U.S. PAT. NO. 3,493,831 issued to A. S. Roberts, Sr., and assigned to the present assignee, for instance, concerns a single-sensor BDCM having a single pair of stator poles and a sensor of the aforementioned type. Each stator pole is wound with first and second coils. The first of these coils on each pole are serially connected so as to produce a magnetic field of one sense whereas the second coils are serially connected so as to produce a magnetic field of the opposite sense. Thus a given stator winding consists of two coils. A commutating means alternately energizes the first and second windings in response to switching signals from the sensing means.

The value of such motors lies in their simplicity and dependability. Prior art braking systems require logic circuits and complex circuitry. The braking system of the present invention provides braking with a relatively simple circuit in keeping with the overall simplicity of the basic motor.

SUMMARY OF THE INVENTION

Dynamic braking capability is provided in a single-sensor, two-winding BDCM by employing separately energized commutating means that operate to connect one of the stator windings in a closed circuit in the absence of a signal from the single sensor. Braking is achieved by terminating the flow of external power to the stator windings while maintaining the flow of power to the commutating means. Under these conditions, a stator winding is connected in a closed circuit so that the kinetic energy of the rotor may be absorbed by virtue of currents flowing in the closed circuit as a result of voltages induced in the stator winding by the moving magnetic field associated with the rotor.

DESCRIPTION OF THE PREFERRED EMBODIMENT

Figure 1:
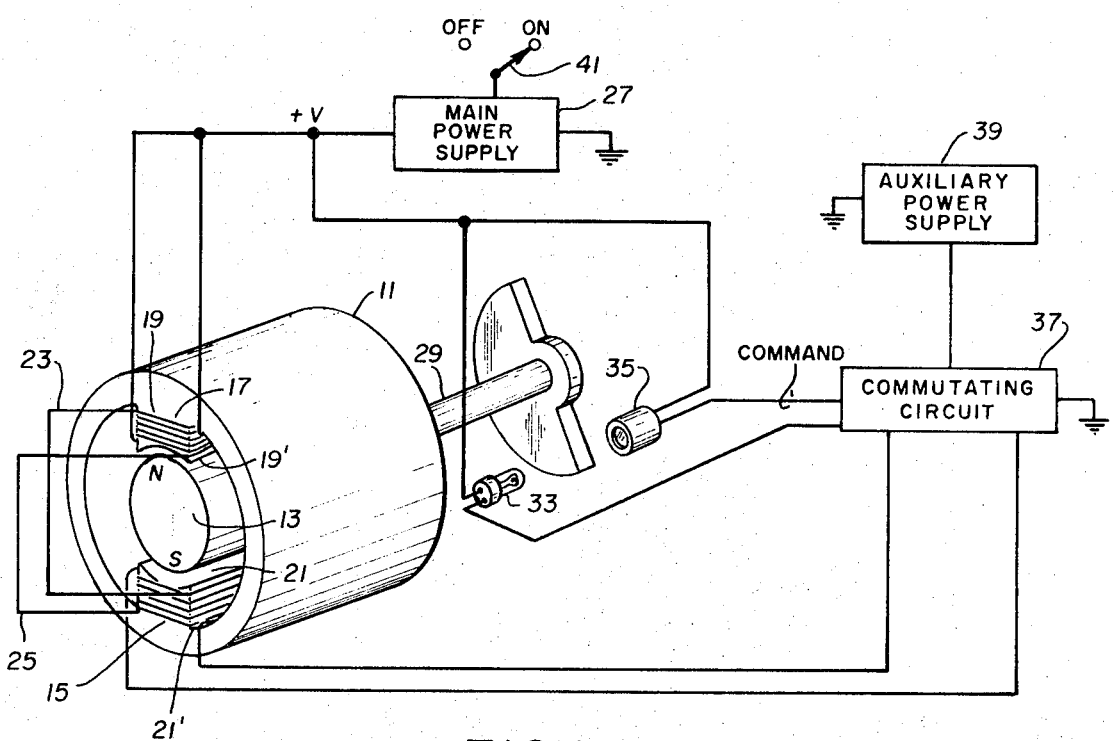
FIG. 1 is a view, partly in perspective, functionally illustrating the mechanical features of a typical motor employing the principles of the invention.

FIG. 1 illustrates a typical motor employing the principles of the invention. The motor consists of a housing 11 inside of which a permanently magnetized rotor 13 may rotate. A pair of stator poles 15 and 17 are arranged along a diameter of the housing. Each stator pole carries two oppositely wound coils. Thus the stator pole 17 is wound with the coils 19 and 19' whereas the pole 15 is wound with the coils 21 and 21'. The coils 19 and 21 are connected in series through a lead 23 whereas the coils 19' and 21' are connected in series through a lead 25. A commutating circuit, which will be explained in detail, permits the flow of unipolar current alternately through the first combination of coils 19-21 and the second combination of coils 19'-21'. The series connected coils 19 and 21 cooperate to form a first stator winding that establishes a magnetic field across the stator in a first direction when these coils are energized. The series connected coils 19' and 21' similarly cooperate to form a second stator winding that establishes a magnetic field across the rotor in the opposite direction when these coils are energized.

The rotor 13 is mounted on a shaft 29 which also carries a semicircular shutter 31. The shutter rotates between a light source 33 and a photosensor 35. Thus the photosensor 35 is illuminated during one-half of each revolution under normal conditions. In this way, when the rotor is aligned so that its N-S axis is anywhere within a given semicircular sector, an output will be derived from the photosensor 35. This output constitutes a command signal. When the rotor is aligned within the opposite sector, the photosensor 35 is darkened and there is no command signal.

The stator windings, as well as the light source 33 and the photosensor 35, are energized from the main power supply 27. A commutating circuit 37 receives the information from the photosensor 35 and switches the appropriate stator winding into the circuit as will be explained. The commutating circuit is energized from a separate auxiliary power supply 39.

The main power supply 27 may be turned off independently of the auxiliary power supply by any convenient means as functionally illustrated by the switch 41.

As will be evident to those skilled in the art, the position-sensing means comprising the shutter 31, the light source 33 and the photosensor 35 operate in conjunction with the commutating circuit 37 to energize the stator windings in synchronism with rotor rotation so as to attract the magnetic poles on the rotor at appropriate times so as to maintain rotation.

Figure 2:
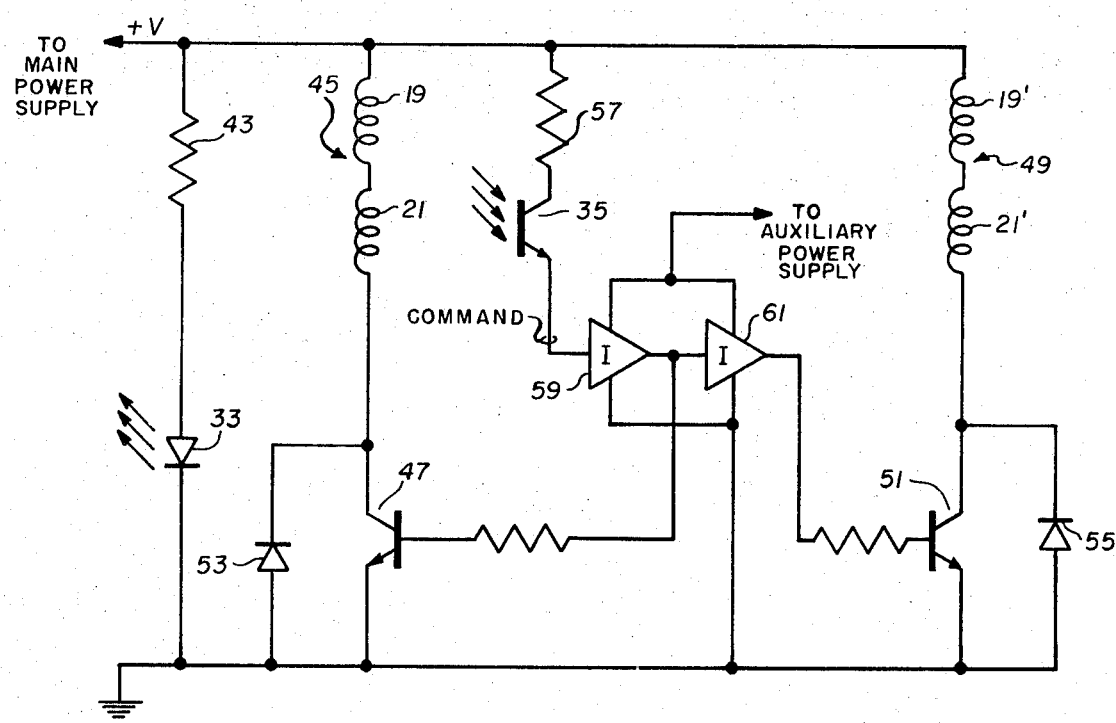
FIG. 2 is a diagram of a circuit that may be used in practicing the invention.

The operation of the motor and the braking circuit may be better understood by referring to FIG. 2. The positive side of the main power supply is applied to a light source 33. This light source may conveniently take the form of a light-emitting diode, an incandescent lamp, or other conventional source. A series dropping resistor 43 may be connected in series with the light source 33, if desired.

A first stator winding 45, which includes one of the coils on each stator pole, is connected to one side of the main power supply and through a transistor 47 to the other side of the power supply. Similarly, a second stator winding 49, which includes the other coil on each stator pole, is connected to the high-voltage side of the main power supply, and through a transistor 51 to the other side of the main power supply. A diode 53 is connected across the transistor 47 and a diode 55 is connected across the transistor 51. A photosensor 35 is connected through a suitable dropping resistor 57 to the high voltage side of the main power supply.

The output of the photosensor 35 is connected to a first inverter 59 which, in turn, is connected to a second inverter 61. The inverters are energized from the auxiliary power supply 39. The output of the first inverter 59 is coupled to the base electrode of the transistor 47 through a suitable dropping resistor and the output of the second inverter is coupled to the base electrode of the transistor 51 through another suitable dropping resistor.

In operation, both the main power supply and the auxiliary power supply are energized while the motor is running normally. During the portion of a revolution when the photosensor is illuminated, a command signal will be applied to the inverter 59. This will cause the output of the inverter 59 to drop to a low level and turn off the transistor 47. The low-level output signal of the inverter 59 is also applied to the second inverter 61. This causes a high level signal to appear at the output of the inverter 61 so as to turn on the transistor 51.

Under these conditions, an energizing current will flow through the stator winding 49 so as to cause rotation of the rotor.

When the rotation has progressed sufficiently far so that the shutter 31 prevents light from reaching the photosensor 35, the command signal from the photosensor will disappear. This will cause a high-level signal to appear at the output of the inverter 59 and a low-level signal to appear at the output of the inverter 61. The transistor 47 will now be driven into conduction and the transistor 51 will be cut off.

Energizing current will now flow through the stator winding 45 and a magnetic field will appear between the poles of the motor. This will cause continued rotation of the rotor.

It will be noticed that the inverters 59 and 61 operate as a bistable device having a first stable state in which the transistor 47 is driven into conduction and a second stable state in which the transistor 51 is driven into conduction.

Thus as long as the auxiliary power supply 39 is energized, one or the other of the transistors 47 and 51 will be in a conducting state. Therefore, even though the main power supply is turned off so that the photosensor 35 is not energized, a high-level signal will be produced by the inverter 59 and the transistor 47 will be in a conductive condition.

Assume now, that it is desired to brake the motor after it has been running normally. The main supply voltage will be turned off while the auxiliary supply voltage is kept on. This will turn on the transistor 47. The momentum of the rotor will cause it to keep rotating and the magnetic field associated with the rotor will induce voltages in the stator winding 45. Currents resulting from this induced voltage can flow through the transistor 47, the diode 55 and the stator winding 49 in a closed loop. This current will be absorbed in the circuit and act as a drag on the rotor. In accordance with well-known principles of dynamic braking, the rotor will now come smoothly and rapidly to a halt.

In summary, the motor may be run in its normal condition by applying voltages from the main power supply and the auxiliary power supply. Dynamic braking may be achieved by turning off the main power supply while keeping the auxiliary power supply on. If desired, the motor may be allowed to coast to a stop by simultaneously turning off both the main power supply and the auxiliary power supply. Alternatively, the motor may be allowed to coast to a stop by turning the auxiliary power supply off before the main power supply is turned off.

The diodes 53 and 55 serve to suppress transients across the transistors 47 and 51.

The bistable means including the two inverters 59 and 61 may conveniently take the form of a miniaturized circuit as is well known in the art.

The transistors 47 and 51 act as switching means and could be replaced by any suitable alternative switching means. Each of the transistors for instance could be replaced by a cascaded series or a conventional Darlington amplifier if more gain is required. The light source may be connected in shunt as shown; however, in some cases, it may be desirable to connect the light source in a known type of series circuit between the main power supply and the commutator circuit.

The circuit diagram of the present invention illustrates how a motor employing the principles of the invention may be constructed in a simple and reliable form. Miniaturization may be used to reduce the size of the motor circuits to a minimum.

It will be appreciated that the motor may be made reversible if desired by simple expedients such as incorporating a double-pole, double-throw switch in the lines leading from the commutating circuit to the stator winding.

In such a form, a motor is particularly useful in applications where the motor is to drive a load that must be reversed quickly. In certain camera-aiming operations, for instance, the motor may be required to operate the camera in a scanning operation. The dynamic braking assures that the camera will be brought to a smooth and rapid stop at the end of each scan.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A single-sensor brushless DC motor comprising a cylindrical housing, first and second stator windings arranged to establish magnetic fields in opposite directions along a diameter of the housing, a permanently magnetized rotor rotatable within said housing, a main power supply for energizing said stator windings, sensing means energized by said main power supply for providing a command signal when and only when the rotor is aligned with a given semicircular sector, commutation means including first transistor switching means for connecting said first stator winding in a closed circuit across said main power supply in response to a command signal and second transistor switching means for connecting said second stator winding in a closed circuit across said main power supply in the absence of a command signal, individual diodes connected across each of said transistor switching means and oriented to pass current in a direction opposite to that permitted by the associated switching means, an auxiliary power supply for energizing said commutating means, and means for interrupting the flow of power from said main power supply without disturbing the flow of power from said auxiliary power supply, so that current flow may be induced in said stator windings by the motion of said rotor after the motor is deenergized.

2. The motor of claim 1 wherein said sensing means includes a photosensor and means to illuminate said photosensor only when the rotor is aligned within said given semiconductor sector.

3. The motor of claim 2 wherein said sensing means produces a command signal only when the photosensor is energized and illuminated.

4. The motor of claim 3 wherein said commutating means further includes bistable means for closing one of said switches when the bistable means is in a first stable state and the other of said switches when the bistable means is in a second bistable state.

5. The motor of claim 4 wherein said bistable means includes first and second inverting means and each of said switching means includes a transistor, said first inverting means being coupled to receive a command signal from said sensing means, said inverting means being coupled to receive an output signal from said first inverting means, one of said transistors being connected to be driven into conduction by a high-level signal from said first inverting means, the other of said transistors being connected to be driven into conduction by a high-level signal from said second inverting means.

6. The motor of claim 5 wherein said first stator winding is connected in series with one of said transistors across said main power supply and said second stator winding is connected in series with the other of said transistors across said main power supply.

7. The motor of claim 6 wherein both of said stator windings and one side of said photosensor are all connected to the same side of said main power supply, said photosensor being further coupled to said first inverting means.

* * * * *